(12) United States Patent
Hwang et al.

(10) Patent No.: US 10,771,771 B2
(45) Date of Patent: Sep. 8, 2020

(54) METHOD OF DETERMINING CALIBRATION PARAMETER FOR THREE-DIMENSIONAL (3D) DISPLAY DEVICE AND 3D DISPLAY DEVICE USING THE METHOD

(71) Applicant: Samsung Electronics Co., Ltd., Suwon-si, Gyeonggi-do (KR)

(72) Inventors: Hyoseok Hwang, Seoul (KR); Juyong Park, Seongnam-si (KR); Hyun Sung Chang, Seoul (KR); Dong Kyung Nam, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 281 days.

(21) Appl. No.: 14/709,148

(22) Filed: May 11, 2015

(65) Prior Publication Data

US 2016/0150223 A1 May 26, 2016

(30) Foreign Application Priority Data

Nov. 24, 2014 (KR) ........................ 10-2014-0164755

(51) Int. Cl.
 *H04N 13/327* (2018.01)
 *H04N 13/106* (2018.01)
 *H04N 13/324* (2018.01)
 *H04N 13/398* (2018.01)
 *H04N 13/302* (2018.01)

(52) U.S. Cl.
 CPC ......... *H04N 13/327* (2018.05); *H04N 13/106* (2018.05); *H04N 13/302* (2018.05); *H04N 13/324* (2018.05); *H04N 13/398* (2018.05)

(58) Field of Classification Search
 CPC ........... H04N 13/0425; H04N 13/0007; H04N 13/0497; H04N 13/0422; H04N 13/0402
 See application file for complete search history.

(56) References Cited

U.S. PATENT DOCUMENTS

| 2007/0268589 | A1 | 11/2007 | Ra et al. | |
|---|---|---|---|---|
| 2012/0050487 | A1* | 3/2012 | Masumura | H04N 13/0406 348/46 |
| 2013/0182083 | A1* | 7/2013 | Grossmann | H04N 13/0402 348/51 |

(Continued)

FOREIGN PATENT DOCUMENTS

| CN | 101681025 A | 3/2010 |
|---|---|---|
| CN | 102401631 A | 4/2012 |

(Continued)

OTHER PUBLICATIONS

Office Action for Corresponding Chinese Patent Application No. 201510555999.0 dated Nov. 1, 2017 and English translation thereof.

(Continued)

*Primary Examiner* — Nasim N Nirjhar
(74) *Attorney, Agent, or Firm* — Harness, Dickey & Pierce, P.L.C.

(57) ABSTRACT

A method of determining a calibration parameter for a three-dimensional (3D) display device includes determining a calibration parameter for a 3D display device based on an image of a second pattern three-dimensionally converted from an image of a first pattern.

42 Claims, 23 Drawing Sheets

(56) References Cited

U.S. PATENT DOCUMENTS

| | | | | |
|---|---|---|---|---|
| 2014/0009579 A1* | 1/2014 | Sumi | ............ | H04N 13/0425 |
| | | | | 348/46 |
| 2014/0139517 A1 | 5/2014 | Hung | | |
| 2014/0146144 A1 | 5/2014 | Li et al. | | |

FOREIGN PATENT DOCUMENTS

| | | | |
|---|---|---|---|
| CN | 103529553 | A | 1/2014 |
| CN | 103841394 | A | 6/2014 |
| CN | 104155765 | A | 11/2014 |
| DE | 102007026628 | B3 | 8/2008 |
| EP | 2615838 | A1 | 7/2013 |
| JP | 2007-065441 | A | 3/2007 |
| KR | 20100064525 | A | 6/2010 |
| KR | 20120015269 | A | 2/2012 |
| KR | 20130031492 | A | 3/2013 |

OTHER PUBLICATIONS

Weiming Li et al., "Principal Observation Ray Calibration for Tiled-Lens-Array Integral Imaging Display", Computer Vision Foundation, pp. 1019-1026.
Extended European Search Report for European Patent Application No. 15170284.2 dated Apr. 6, 2016.
Japanese Office Action dated Dec. 17, 2019 for corresponding Japanese application No. 2015-229078 and English translation thereof.

* cited by examiner

FIG. 11B

| n | θ (deg) | P (mm) |
|---|---------|--------|
| 1 | 23.2735 | 1.08   |
| 2 | 11.9920 | 0.5566 |
| 3 | 8.0214  | 0.3723 |
| 4 | 6.0218  | 0.2795 |

1200

METHOD OF DETERMINING CALIBRATION PARAMETER FOR THREE-DIMENSIONAL (3D) DISPLAY DEVICE AND 3D DISPLAY DEVICE USING THE METHOD

CROSS-REFERENCE TO RELATED APPLICATION

This application claims the priority benefit of Korean Patent Application No. 10-2014-0164755, filed on Nov. 24, 2014, in the Korean Intellectual Property Office, the entire contents of which are incorporated herein by reference in its entirety.

BACKGROUND

1. Field

At least one example embodiment relate to a method of determining a calibration parameter for a three-dimensional (3D) display device, and a 3D display device using the method.

2. Description of the Related Art

Among factors related to three-dimensional (3D) image recognition, the foremost factor is a disparity between images viewed by both eyes of a user. Methods of providing different images to both eyes of a user may be classified into a stereoscopic type and an autostereoscopic type. The stereoscopic type method may filter a desired image through division methods that involve using a polarized light, time division, and wavelength division for differentiating a wavelength of a primary color. The autostereoscopic type method may enable images to be viewed only in a desired (or alternatively, predetermined) space using a 3D converter, for example, a parallax barrier, a lenticular lens, or a directional backlight unit.

The autostereoscopic type method may alleviate an inconvenience of wearing glasses. However, in the autostereoscopic type method, when an error differing from a design value occurs in a process of producing a 3D display device or a process of installing a 3D converter, an image quality may deteriorate due to crosstalk.

SUMMARY

At least one example embodiment relates to methods of determining a calibration parameter for a three-dimensional (3D) display device.

In at least one example embodiment, the method may include acquiring an image of a second pattern output through a panel and an optical layer as an image of a second pattern, and determining a calibration parameter for the 3D display device based on the first pattern and the second pattern.

The first pattern may be displayed using subpixels aligned in the panel. The first pattern may be a pattern in which continuous lines of an identical brightness are disposed at desired intervals. The second pattern may be a pattern in which lines including a plurality of points are disposed at desired intervals. The image of the second pattern may be a single image.

The optical layer may include at least one of a lens array, a parallax barrier, and a directional backlight unit.

The calibration parameter may include at least one of a parameter associated with a size of the optical layer, and a parameter associated with a position of the optical layer. The parameter associated with the size of the optical layer may include a pitch of the optical layer. The parameter associated with the position of the optical layer may include a rotation angle between the optical layer and the panel.

The determining may include obtaining a parameter corresponding to a period of the first pattern based on a subpixel structure of the panel. The parameter corresponding to the period of the first pattern may include an interval between lines included in the first pattern. The subpixel structure of the panel may include an interval between subpixels of a color used for the first pattern in the panel.

The determining may include at least one of measuring a parameter corresponding to a gradient of the second pattern, and measuring a parameter corresponding to a period of the second pattern. The parameter corresponding to the gradient of the second pattern may include a slope of a line included in the second pattern. The parameter corresponding to the period of the second pattern may include an interval between lines included in the second pattern.

The determining may include performing a Fourier transform on the image of the second pattern, measuring a parameter corresponding to a gradient of the second pattern based on the Fourier-transformed image, and measuring a parameter corresponding to a period of the second pattern based on the Fourier-transformed image.

The measuring of the parameter corresponding to the period of the second pattern may include calculating a height difference between pixels having highest intensities in the Fourier-transformed image, and calculating an interval between lines included in the second pattern based on the calculated height difference and a height of the Fourier-transformed image.

The measuring of the parameter corresponding to the gradient of the second pattern may include calculating a slope of a first line connecting pixels having highest intensities in the Fourier-transformed image, and calculating a slope of a second line included in the second pattern based on the calculated slope of the first line.

The measuring of the parameter corresponding to the gradient of the second pattern may further include detecting a point that is horizontally closest to an origin of the Fourier-transformed image, and calculating a slope of a third line connecting the origin and the detected point. The slope of the second line included in the second pattern may be calibrated based on the calculated slope of the third line connecting the origin and the detected point.

The determining may include calculating the calibration parameter based on a parameter corresponding to a period of the first pattern, a parameter corresponding to a gradient of the second pattern, and a parameter corresponding to a period of the second pattern.

The determining may include calculating a rotation angle between the optical layer and the panel and a pitch of the optical layer based on Equations 1 and 2, $$g\tan\alpha\sin\theta + g\cos\theta - np = 0 \qquad \text{[Equation 1]}$$

$$c = \frac{p}{\sin\theta}. \qquad \text{[Equation 2]}$$

g denotes a parameter corresponding to a period of the first pattern, a denotes a parameter corresponding to a gradient of the second pattern, c denotes a parameter corresponding to a period of the second pattern, n denotes a number of elements of the optical layer corresponding to a single period of the first pattern, θ denotes the rotation angle between the optical layer and the panel, and p denotes the pitch of the optical layer.

The calculating of the rotation angle between the optical layer and the panel and the pitch of the optical layer may include calculating (n, θ) candidates having n being a positive integer, and θ being an angle within a desired (or alternatively, predetermined) range, selecting one of the (n, θ) candidates based on an initial parameter, and calculating p corresponding to the selected (n, θ) candidate.

When a subpixel structure of the panel corresponds to a red, green, and blue (RGB) stripe structure, the first pattern may correspond to a stripe pattern having one of red, green, and blue colors, and a direction in which subpixels of an identical color are continuously disposed in the panel.

At least one example embodiment relates to a 3D display device.

In at least one example embodiment, the 3D display device may include a calibrator configured to calibrate mapping information of a subpixel included in a panel based on a calibration parameter for the 3D display device, and a renderer configured to perform rendering for a 3D image based on the calibrated mapping information. The calibration parameter may be determined based on an image of a second pattern output through a combination of the panel and an optical layer when an image of a first pattern is applied to the panel.

According to at least one example embodiment, a device includes a determiner configured to determine a calibration parameter for a three-dimensional (3D) display device based on a first image having a first pattern and a second image having a second pattern. The second image is a version of the first image that is displayed with a panel and an optical layer of the 3D display device. The device includes a calibrator configured to calibrate subpixels of the panel based on the calibration parameter to indicate a propagation direction of light from each subpixel.

The first pattern is a pattern in which continuous lines of an identical brightness are at desired intervals.

The second pattern is a pattern in which lines comprising a plurality of points are at desired intervals.

The optical layer comprises at least one of a lens array, a parallax barrier, and a directional backlight.

The calibration parameter comprises at least one of a parameter associated with a size of the optical layer and a parameter associated with a position of the optical layer.

The device includes a renderer configured to render a calibrated image based on the calibrated subpixels.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 11A and 11B illustrate a method of deducing candidate solutions according to at least one example embodiment;

DETAILED DESCRIPTION OF EXAMPLE EMBODIMENTS

Figure 1:
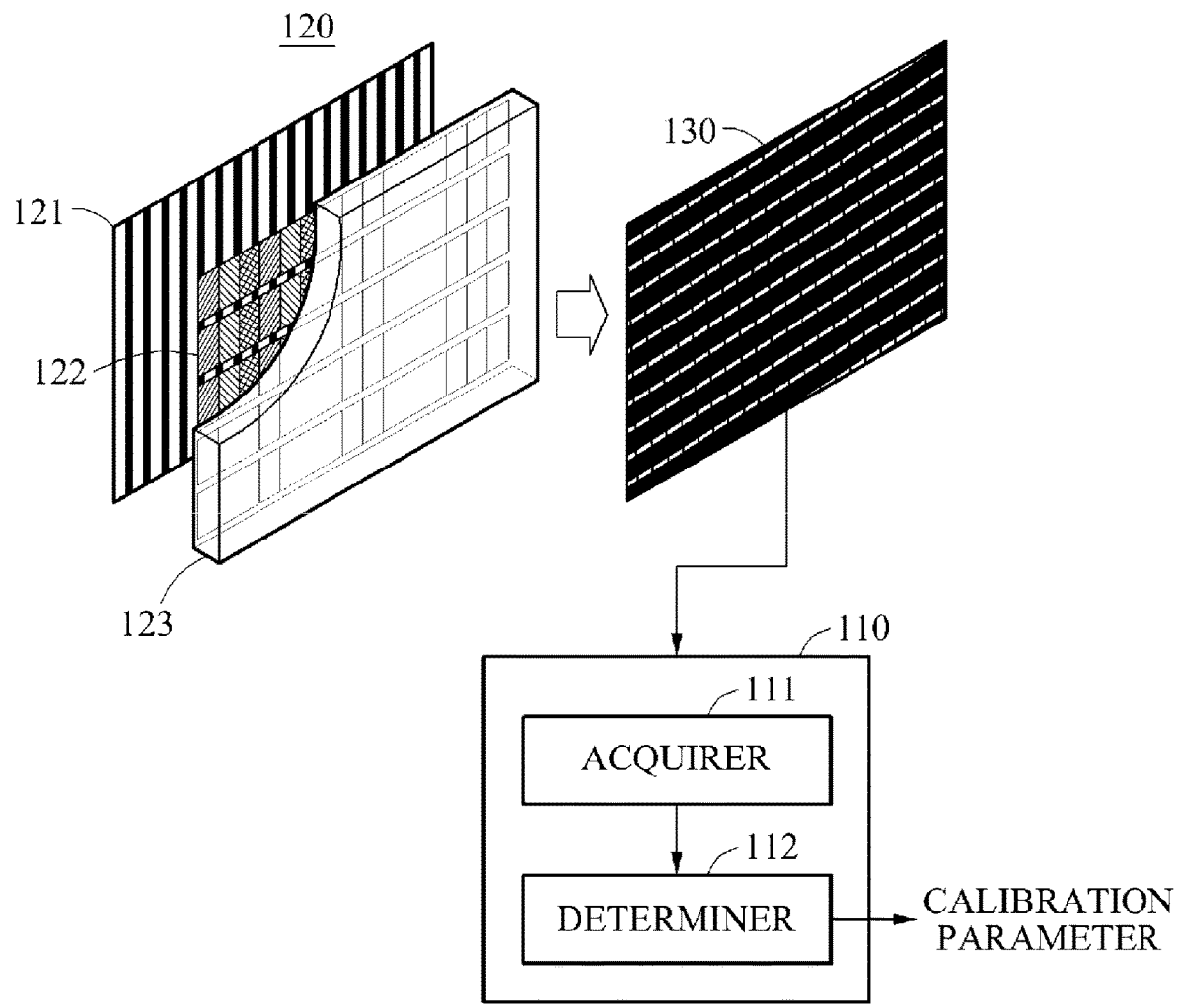
FIG. 1 illustrates an apparatus for determining a calibration parameter for a three-dimensional (3D) display device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, reference will now be made in detail to embodiments, examples of which are illustrated in the accompanying drawings, wherein like reference numerals refer to like elements throughout. The following example embodiments may be applied to various display devices. For example, the example embodiments may be applied to display devices attached to, for example, televisions, digital signage, tablet computers, and smart phones.

FIG. 1 illustrates an apparatus for determining a calibration parameter for a three-dimensional (3D) display device according to at least one example embodiment. Referring to FIG. 1, an apparatus 110 for determining a calibration parameter according to at least one example embodiment may determine a calibration parameter for a 3D display device 120. The 3D display device 120 may be a device configured to display a 3D image, and may include, for example, a glasses-free 3D display device.

The glasses-free 3D display device may be a device that enables a user to view a 3D image without wearing an additional device, for example, glasses. The glasses-free 3D display device may also be referred to as an autostereoscopic display device or a multi-view display device.

Light output from pixels included in a two-dimensional (2D) display device may propagate in all directions, whereas light output from pixels included in the glasses-free 3D display device may propagate in limited (e.g., desired) directions through an optical layer. Thus, different images may be incident to both eyes of a user, and the user may experience 3D effects. The optical layer may be used as a 3D converter.

The glasses-free 3D display device may be implemented in a form in which an optical layer is attached to a front surface or a rear surface of a panel. The optical layer may control a propagation direction of light passing through the panel. The panel may include a liquid crystal display (LCD) panel, a light emitting diode (LED) panel, and an organic light emitting diode (OLED) panel, and the optical layer may include a lens array, a parallax barrier, and a directional backlight unit. For example, pixels of the panel may output light in all directions. When the optical layer is a lens array, light may be refracted by the lens array and output only in desired (or alternatively, predetermined) directions. When the optical layer is a parallax barrier, the parallax barrier may allow light of a desired (or alternatively, predetermined) direction to pass, and block light of other directions.

In a case of a glasses-type 3D display device, a left image and a right image may be filtered by glasses worn by a user using, for example, a time difference, a polarization of light, and a color filter. Thus, stereo images are divided based on a time or a space and may be displayed in all directions. Conversely, in a case of the glasses-free 3D display device, a direction of light may be determined at a point in time at which the light is output from the glasses-free 3D display device. Accordingly, when an error occurs between an actual direction of light and a designed direction of light, crosstalk may occur. When crosstalk occurs, the user may view blurred images. When a serious error occurs, the user may view distorted images that may cause dizziness.

In general, two factors may cause an error between an actual direction of light and a designed direction of light. First, an error in a size of an optical layer may cause an error between an actual direction of light and a designed direction of light. The error in the size of the optical layer refers to a difference between a size of a manufactured optical layer and a designed value (i.e., a manufacturing error). A representative example of the size may be a pitch of the optical layer. The glasses-free 3D display device may handle subpixel units, and a size thereof may be a unit of millimeters or smaller. A 3D image may change due to a size error of micrometers or smaller. Such a size error may occur in a stage of processing or manufacturing the optical layer.

Second, an error in a position of an optical layer may cause an error between an actual direction of light and a designed direction of light. The error in the position of the optical layer refers to a difference between an actual position in which the optical layer is attached to a panel and a designed position in which the optical layer should be attached to the panel. The position of the optical layer may include a height and an angle at which the optical layer is attached to the panel. A representative example of the position may be a rotation angle between the optical layer and the panel. When designing a glasses-free 3D display device, an arrangement of pixels included in a panel and a position of an optical layer may be considered. However, when actually attaching the optical layer to the panel, a position error may occur. A minute change in an angle caused by the position error may result in a drastic change in a 3D image.

At least one example embodiment may reduce (or alternatively, prevent) an occurrence of a crosstalk by calibrating an arrangement of pixels of a panel based on a current size and a current position of an optical layer although a size error and a position error exist. For example, at least one example embodiment may calibrate mapping information of a subpixel included in the panel, and render a 3D image based on the calibrated mapping information.

For such calibration, an accurate estimation of a size error and a position error may be required. At least one example embodiment may provide technology that displays an image 121 of a desired (or alternatively, predetermined) first pattern on a panel 122 of the 3D display device 120, captures an image 130 of a second pattern played at a position of a user, and determines a calibration parameter for the 3D display device 120 based on the captured image 130 of the second pattern.

As will be described in detail below, at least one example embodiment may use a single image to determine the calibration parameter for the 3D display device 120. Further, at least one example embodiment may not require an accurate viewpoint, an accurate positioning of optical layer 123, and/or a position of an image sensor to be used to capture the image 130 of the second pattern. For example, to capture the image 130 of the second pattern, a general image sensor or a general camera may be used.

The apparatus 110 for determining a calibration parameter may include an acquirer 111 and a determiner 112. The acquirer 111 may acquire the image 130 of the second pattern output through the panel 122 and an optical layer 123 when the image 121 of the first pattern is applied to the panel 122. Each of the acquirer 111 and the determiner 112 may be implemented as software, hardware, or a combination thereof.

Figure 2:
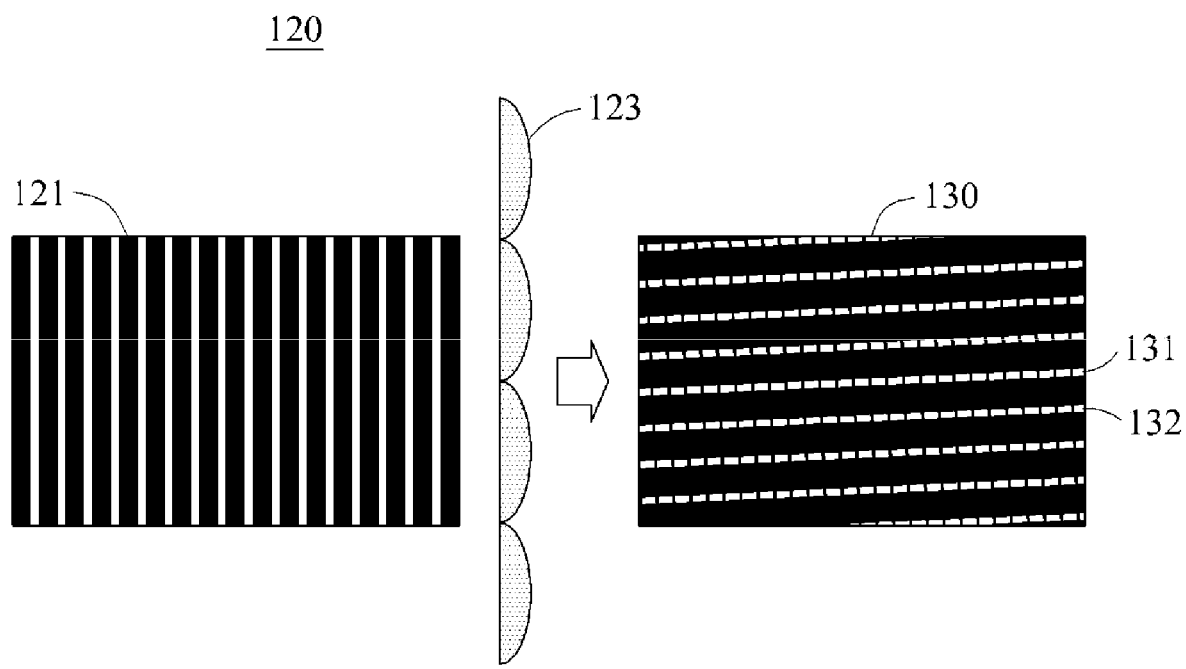
FIG. 2 illustrates a relationship between an image of a first pattern and an image of a second pattern according to at least one example embodiment.

Referring to FIG. 2, the image 121 of the first pattern may include a pattern in which continuous lines of an identical brightness are disposed at desired (or alternatively, predetermined) intervals. For example, the first pattern may be a stripe pattern. The image 121 of the first pattern may pass through the optical layer 123 and be displayed to a viewer as the image 130 of the second pattern. The image 130 of the second pattern may be a ray image passing through a central point of the optical layer 123, for example, a central axis of a lens, or a slit. The image 130 of the second pattern may include a pattern in which lines including a plurality of points are disposed at desired (or alternatively, predetermined) intervals. For example, the image 130 of the second pattern may include repetitive lines having a single principal direction.

A slope of each line included in the image 130 of the second pattern may differ from a slope of each line included in the image 121 of the first pattern. For example, lines included in the image 121 of the first pattern may be vertical lines, and lines included in the image 130 of the second pattern may be inclined lines. Further, an interval between the lines included in the image 130 of the second pattern may differ from an interval between the lines included in the image 121 of the first pattern. As will be described in detail below, the determiner 112 may determine the calibration parameter for the 3D display device 120 by analyzing two adjacent lines 131 and 132 from among the lines included in the image 130 of the second pattern. For example, the determiner 112 may determine a position and a pitch of the optical layer 123 based on the interval between the line 131 and the line 132, and slopes of the line 131 and the line 132.

Figure 3:
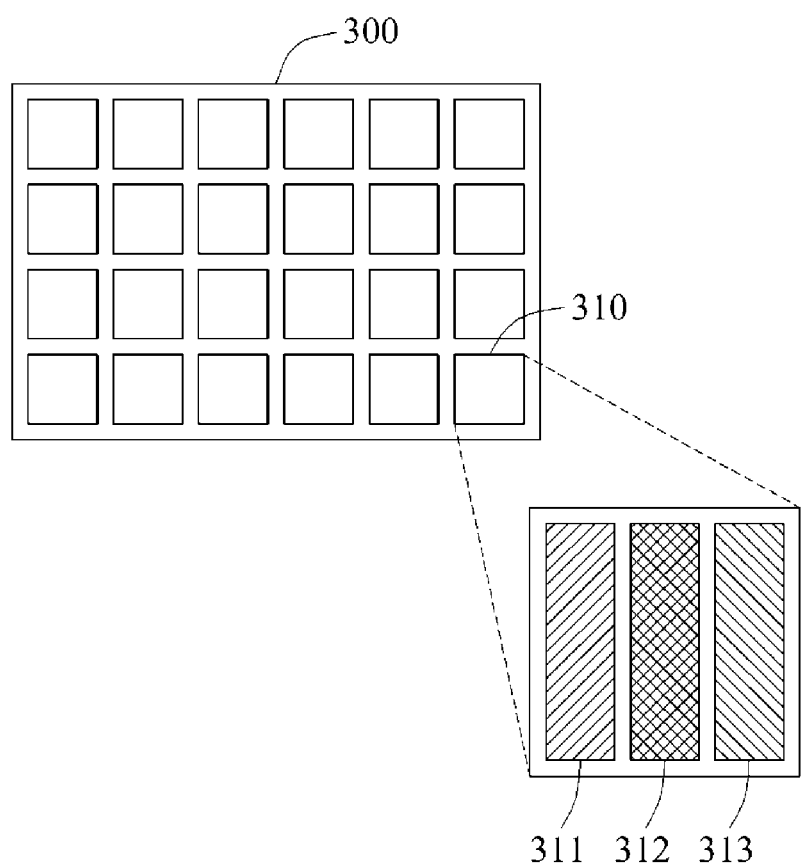
FIG. 3 illustrates a method of displaying an image of a first pattern according to at least one example embodiment.

The image 121 of the first pattern may be displayed using subpixels continuously disposed (or aligned) in the panel 122. Referring to FIG. 3, a panel 300 of a 3D display device may include a plurality of pixels 310 with a plurality of subpixels. For example, a pixel 310 may include a red (R) subpixel 311 corresponding to a red color, a green (G) subpixel 312 corresponding to a green color, and a blue (B) subpixel 313 corresponding to a blue color. The subpixels of the pixel 310 may be disposed in a stripe structure.

The lines included in the image 121 of the first pattern may be displayed by turning on subpixels disposed at desired (or alternatively, predetermined) intervals in an identical column. The subpixels disposed in the identical column may correspond to an identical color. By adjusting an interval at which the subpixels in the identical column are to be turned on or a period for which the subpixels in the identical column are to be turned on, an interval between the lines included in the image 121 of the first pattern or a period may be adjusted. Hereinafter, for ease of description, example embodiments in which pixels included in the panel of the 3D display device may include RGB subpixels of a stripe structure. However, various modifications may be made to a subpixel structure of the panel.

Figure 4:
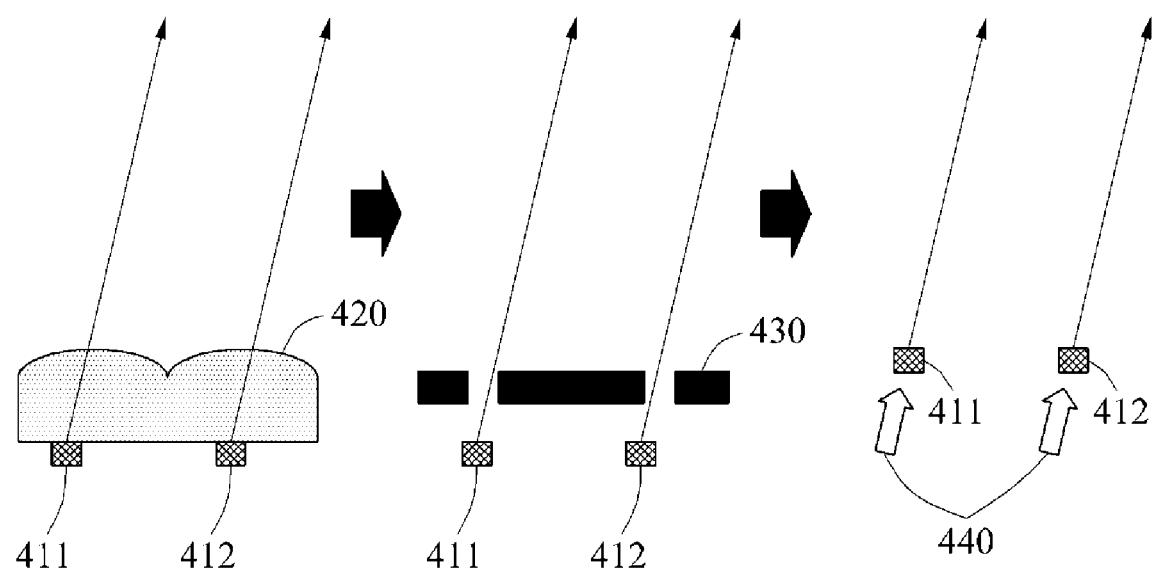
FIG. 4 illustrates a principle of generating an image of a second pattern according to at least one example embodiment.

FIG. 4 illustrates a principle of generating an image of a second pattern according to at least one example embodiment. Referring to FIG. 4, light output through subpixels included in the panel 122 and the optical layer 123 may propagate in limited or desired directions.

In an example, the optical layer 123 may include a lens array 420. The lens array 420 may be a lenticular lens. Light output from subpixels 411 and 412 may be refracted by the lens array 420, and propagate only in directions from the subpixels 411 and 412 toward centers of corresponding lenses, respectively.

In another example, the optical layer 123 may include a parallax barrier 430. The light output from the subpixels 411 and 412 may be blocked by the parallax barrier 430, and propagate only in directions passing through slits of the parallax barrier 430.

When the panel 122 is an LCD panel, backlight units may be attached to a surface to which the lens array 420 is attached and an opposite surface. In this example, the light output from the subpixels 411 and 412 may be light emitted from the backlight units and passing through the subpixels 411 and 412. When the panel 122 is an LED panel or an OLED panel, the subpixels 411 and 412 may independently emit light.

In still another example, the optical layer 123 may include a directional backlight unit 440. The directional backlight unit 440 may be attached to a bottom surface of the panel 122. In this example, the panel 122 may be an LED panel. A general backlight unit may emit light to propagate in all directions, whereas the directional backlight unit 440 may emit light to propagate in limited directions. The light emitted from the directional backlight unit 440 may pass through the subpixels 411 and 412 and propagate.

In describing a point on an optical layer through which light emitted from a subpixel passes and is output, or a point on an optical layer from which light is generated, passes through a subpixel, and is output, a position of a focal point of the lens array 420, a position of a slit of the parallax barrier 430, and a position of a light source of the directional backlight unit 440 may play an identical role. For example, a position of a point included in the image 130 of the second pattern may correspond to the position of the focal point of the lens array 420, the position of the slit of the parallax barrier 430, or the position of the light source of the directional backlight unit 440. Thus, when the lens array 420, the parallax barrier 430, and the directional backlight unit 440 have identical pitches, identical images 130 of the second pattern may be captured. Hereinafter, for ease of description, a case in which the lens array 420 is used will be described. However, example embodiments may be applicable to a case in which the parallax barrier 430 or the directional backlight unit 440 is used.

Figure 5A:
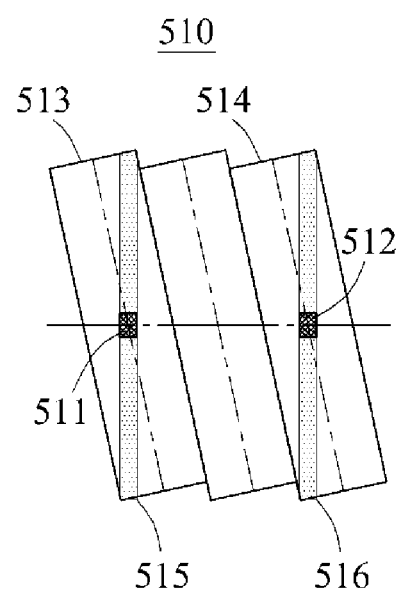
FIGS. 5A through 5C illustrate a principle of determining slopes of lines included in an image of a second pattern according to at least one example embodiment.
Figure 5B:
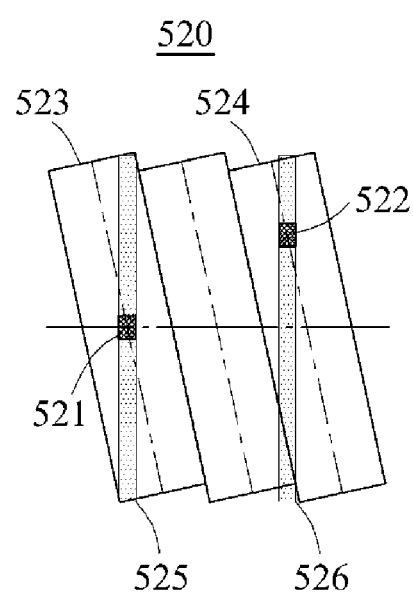
Figure 5C:
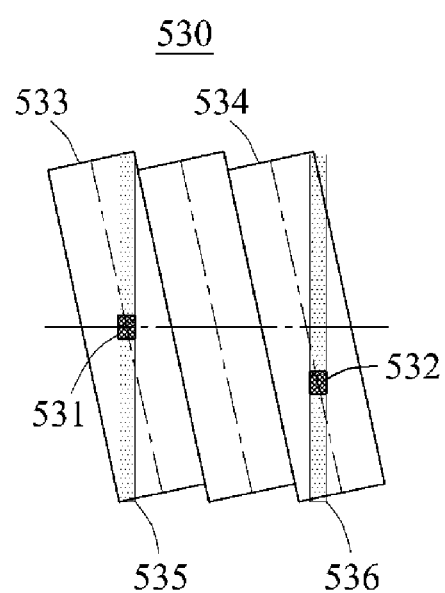

FIGS. 5A through 5C illustrate a principle of determining slopes of lines included in an image of a second pattern according to at least one example embodiment. Referring to FIGS. 5A through 5C, slopes or principal directions of lines included in an image of a second pattern may be determined based on a relationship between an interval between lines included in an image of a first pattern and a horizontal pitch of an optical layer. The horizontal pitch of the optical layer may be a horizontal component of a pitch of the optical layer.

A first case 510 of FIG. 5A, a second case 520 of FIG. 5B, and a third case 530 of FIG. 5C are plane views of a 3D display device viewed from desired (or alternatively, predetermined) points of view. Hereinafter, for ease of description, the points of view from which the 3D display device is viewed in the first case 510, the second case 520, and the third case 530 will be referred to as a first point of view, a second point of view, and a third point of view, respectively.

Referring to the first case 510 of FIG. 5A, lines 515 and 516 may be lines included in an image of a first pattern displayed on a panel. An optical layer may not allow all light output through the lines 515 and 516 to reach the first point of view. Only light output through a point 511 at which the line 515 meets a central axis of a lens 513, and light output through a point 512 at which the line 516 meets a central axis of a lens 514 may reach the first point of view. When points similar to the points 511 and 512 gather together, an image of a second pattern may be generated.

When an interval between lines included in the image of the first pattern is identical to a horizontal pitch of the optical layer, slopes of the lines included in the image of the second pattern may be equal to "0". The horizontal pitch of the optical layer may be a horizontal component of a pitch of the optical layer. For example, the horizontal pitch of the optical layer may be a horizontal interval between the central axis of the lens 513 and the central axis of the lens 514. In the first case 510, an interval between the lines 515 and 516 is identical to the horizontal interval between the central axis of the lens 513 and the central axis of the lens 514. Thus, a slope of a line formed by the points 511 and 512 may be equal to "0".

Referring to the second case 520 of FIG. 5B, light output through a point 521 at which a line 525 meets a central axis of a lens 523, and light output through a point 522 at which a line 526 meets a central axis of a lens 524 may reach the second point of view. When the horizontal pitch of the optical layer is greater than the interval between the lines included in the image of the first pattern, the slopes of the lines included in the image of the second pattern may be greater than "0". In the second case 520, a horizontal interval between the central axis of the lens 523 and the central axis of the lens 524 is greater than an interval between the lines 525 and 526. Thus, a slope of a line formed by the points 521 and 522 may be greater than "0".

Referring to the third case 530 of FIG. 5C, light output through a point 531 at which a line 535 meets a central axis of a lens 533, and light output through a point 532 at which a line 536 meets a central axis of a lens 534 may reach the third point of view. When the horizontal pitch of the optical layer is less than the interval between the lines included in the image of the first pattern, the slopes of the lines included in the image of the second pattern may be less than "0". In the third case 530, a horizontal interval between the central axis of the lens 533 and the central axis of the lens 534 is less than an interval between the lines 535 and 536. Thus, a slope of a line formed by the points 531 and 532 may be less than "0".

The foregoing cases may correspond to cases in which a lens array is inclined leftward. In a case in which the lens array is inclined rightward, the slopes of the lines included in the image of the second pattern may be reversed.

As described above, the slopes of the lines included in the image of the second pattern may be determined based on the relationship between the interval between the lines included in the image of the first pattern and the horizontal pitch of the optical layer. Thus, conversely, when the slopes of the lines included in the image of the second pattern are known, the relationship between the interval between the lines included in the image of the first pattern and the horizontal pitch of the optical layer may be estimated.

Figure 6:
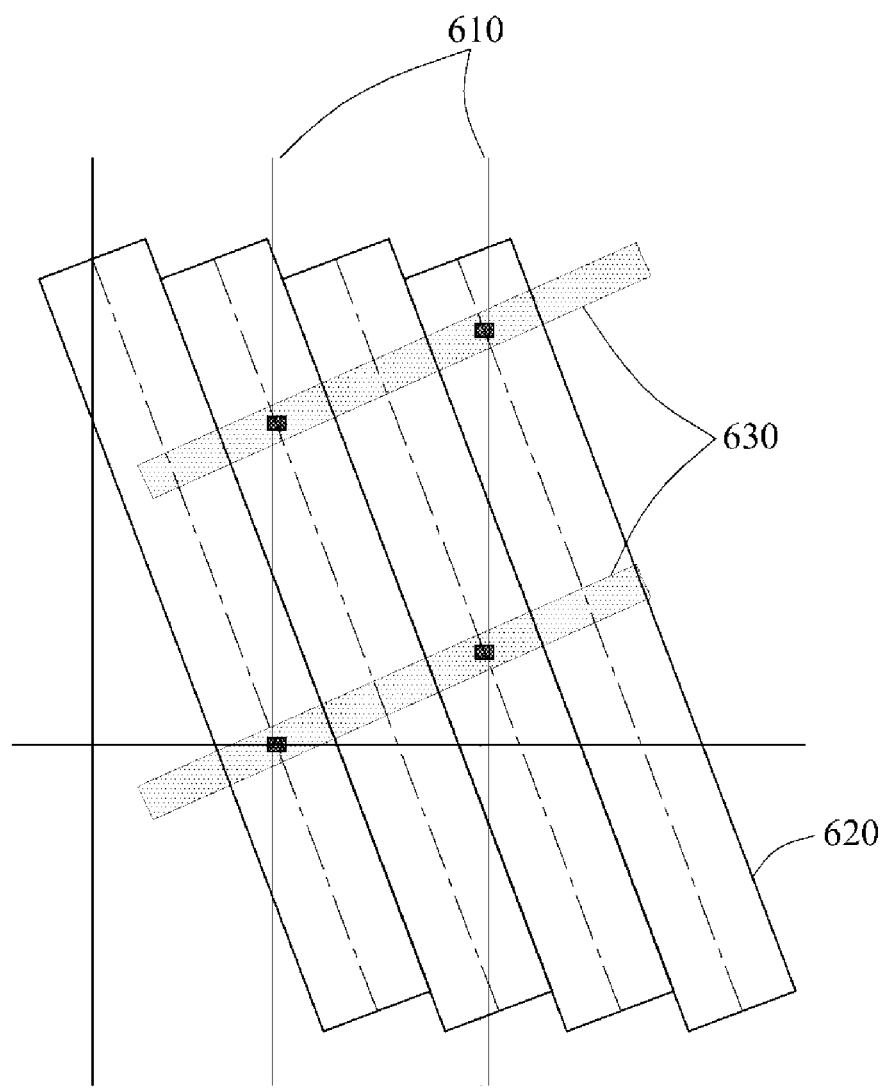
FIG. 6 illustrates a principle of determining an interval between lines included in an image of a second pattern according to at least one example embodiment.

FIG. 6 illustrates a principle of determining an interval between lines included in an image of a second pattern according to at least one example embodiment. Referring to FIG. 6, at least one lens may be provided between adjacent lines included in an image of a second pattern. An interval between the lines included in the image of the second pattern may be determined based on a vertical pitch of an optical layer. The vertical pitch of the optical layer may be a vertical component of a pitch of the optical layer. FIG. 6 is a plan view of a 3D display device viewed from a desired (or alternatively, predetermined) point of view. Hereinafter, for ease of description, the corresponding point of view will be referred to as a fourth point of view.

Lines 610 may be lines included in an image of a first pattern displayed on a panel. As described with reference to FIGS. 5A through 5C, an optical layer 620 may allow only light output through a plurality of points constituting lines 630 to reach the fourth point of view, rather than allowing all light output through the lines 610 to reach the fourth point of view. In this example, a vertical pitch of the optical layer 620 may correspond to a vertical interval between the lines 630.

As described above, the interval between the lines included in the image of the second pattern may be determined based on the vertical pitch of the optical layer. Thus, conversely, when the interval between the lines included in the image of the second pattern is known, the vertical pitch of the optical layer may be estimated.

Figure 7:
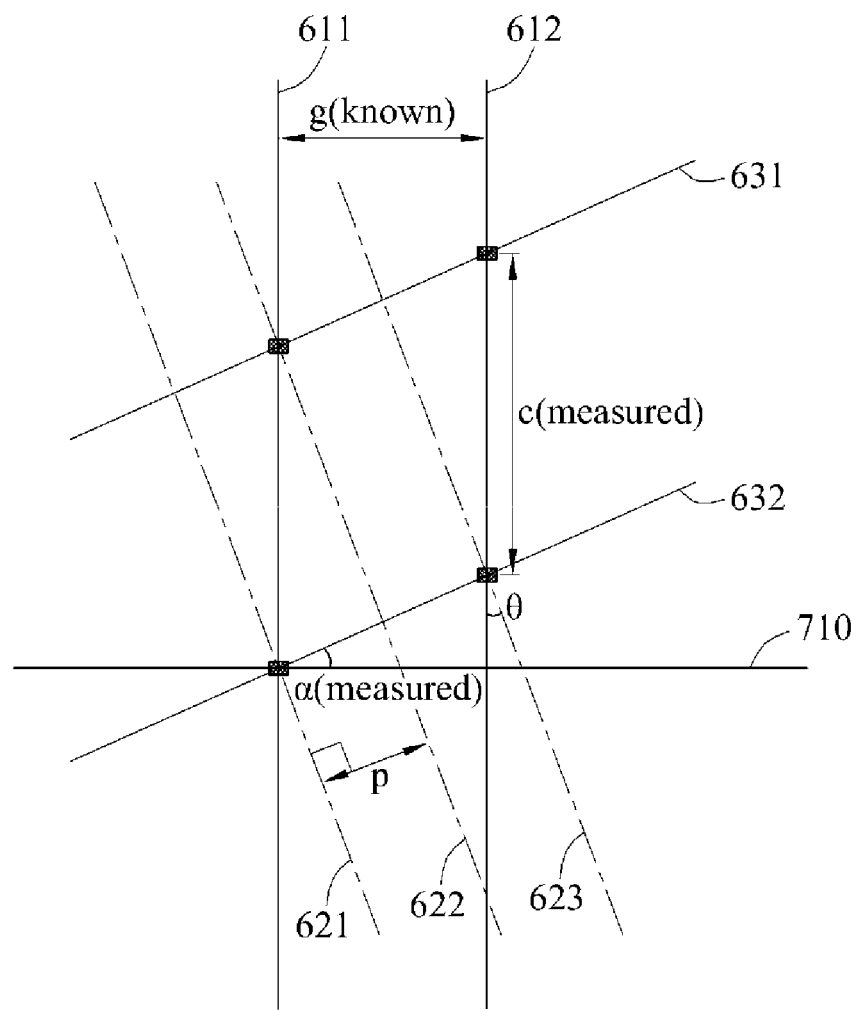
FIGS. 7 through 9 illustrate a geometric relationship between an image of a second pattern and a calibration parameter for a 3D display device.
Figure 8:
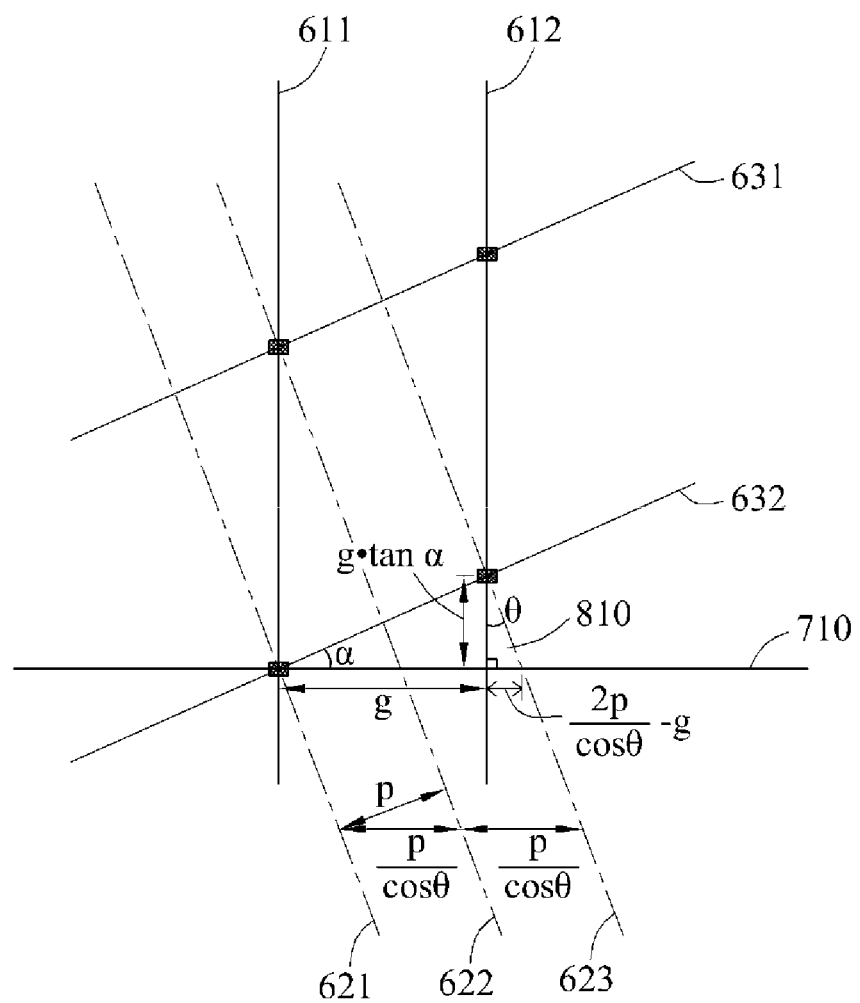
Figure 9:
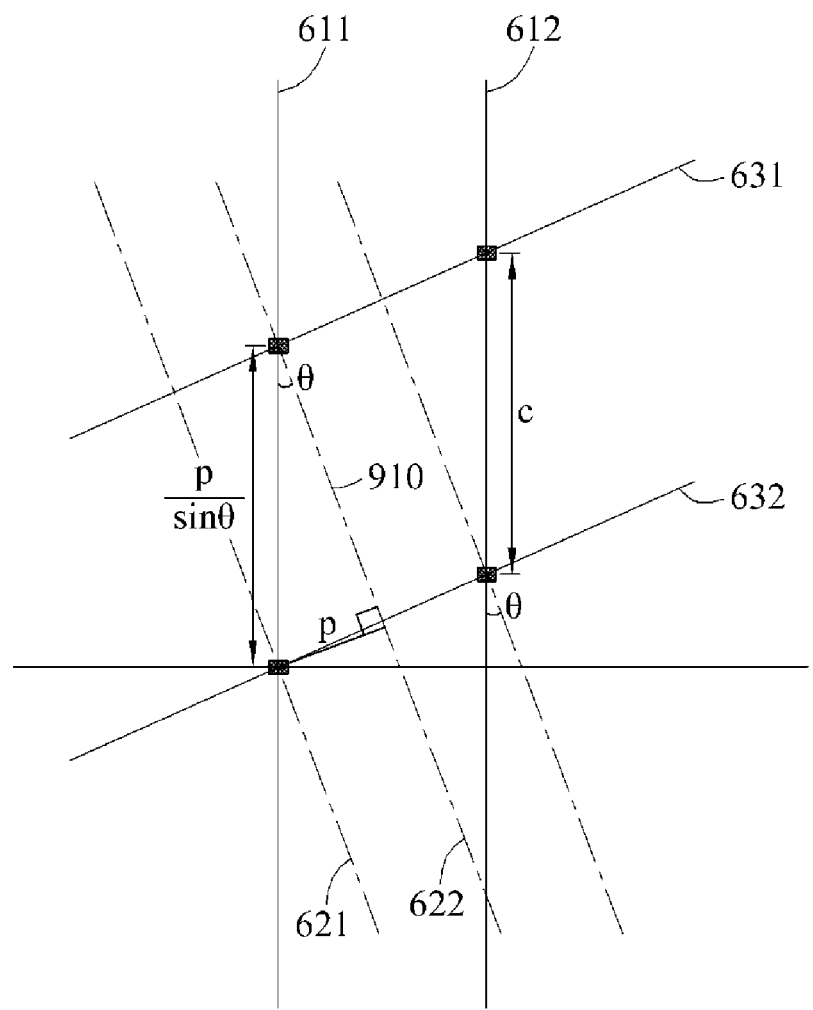

FIGS. 7 through 9 illustrate a geometric relationship between an image of a second pattern and a calibration parameter for a 3D display device. Referring to FIG. 7, an image of a second pattern may include a plurality of points constituting lines 631 and 632. The determiner 112 of FIG. 1 may measure a parameter a corresponding to a gradient of the second pattern from the image of the second pattern. For example, the parameter a corresponding to the gradient of the second pattern may correspond to a slope of the line 632. Further, the determiner 112 may measure a parameter c corresponding to a period of the second pattern from the image of the second pattern. For example, the parameter c corresponding to the period of the second pattern may correspond to a vertical interval between the lines 631 and 632.

A line 611 and a line 612 may be lines included in an image of a first pattern. The determiner 112 may be aware of information on a panel of a 3D display device in advance. For example, the determiner 112 may be aware of a subpixel structure of the panel, a resolution of the panel, and a size of the panel. The subpixel structure of the panel may include an interval between subpixels of a color used for the first pattern in the panel. The determiner 112 may obtain a parameter g corresponding to the period of the first pattern based on the information on the panel. For example, the parameter g corresponding to the period of the first pattern may correspond to an interval between the lines 611 and 612.

The image of the first pattern may be displayed on the panel, and the image of the second pattern may be captured from a desired (or alternatively, predetermined) point of view. Thus, an actual interval between lines displayed on the panel may differ from the interval between the lines 611 and 612 virtually shown on the image of the second pattern. The determiner 112 may obtain the interval between the lines 611 and 612 based on a ratio of the size of the panel to a size of the image of the second pattern.

The determiner 112 may determine a calibration parameter for the 3D display device based on the first pattern and the second pattern. For example, the determiner 112 may determine the calibration parameter for the 3D display device based on the parameter a corresponding to the gradient of the second pattern, the parameter c corresponding to the period of the second pattern, and the parameter g corresponding to the period of the first pattern. The calibration parameter for the 3D display device may include a parameter p associated with the size of the optical layer and a parameter θ associated with a position of the optical layer.

The parameter p associated with the size of the optical layer may be a pitch of the optical layer. The pitch of the optical layer may be an interval between elements included in the optical layer. For example, the pitch of the optical layer may be a shortest interval between a central axis 621 of a first lens and a central axis 622 of a second lens. The parameter θ associated with the position of the optical layer may be a rotation angle of the optical layer. The rotation angle of the optical layer may be an angle at which the optical layer rotates with respect to the panel. For example, the rotation angle of the optical layer may be an angle between a central axis 623 of a third lens and the line 612 displayed on the panel.

Referring to FIG. 8, a horizontal interval between the central axis 621 of the first lens and the central axis 622 of the second lens may be p/cos θ. p/cos θ may be a horizontal pitch of the optical layer. The horizontal interval between the central axis 621 of the first lens and the central axis 622 of the second lens may be equal to a horizontal interval between the central axis 622 of the second lens and the central axis 623 of the third lens. Thus, a horizontal interval between the central axis 621 of the first lens and the central axis 623 of the third lens may be 2·p/cos θ.

Referring to a right triangle 810, a length of a bottom side may be 2·p/cos θ−g, a height may be g·tan α, and one acute angle may be θ. Based on lengths of two sides and one acute angle of the right triangle 810, Equation 1 may be deduced.

$$\tan\theta = \frac{\frac{np}{\cos\theta} - g}{g\tan\alpha} \quad \text{[Equation 1]}$$

Equation 1 may be arranged as expressed by Equation 2.

$$g \tan \alpha \sin \theta + g \cos \theta - np = 0 \quad \text{[Equation 2]}$$

In Equation 2, g denotes a parameter corresponding to a period of a first pattern, and a denotes a parameter corresponding to a gradient of a second pattern. θ denotes a rotation angle between an optical layer and a panel, and p denotes a pitch of the optical layer. n denotes a number of elements of the optical layer corresponding to a single period of the first pattern. For example, n may correspond to a number of lenses provided between adjacent lines included in an image of the second pattern.

Referring to FIG. 9, a vertical interval between the central axis 621 of the first lens and the central axis 622 of the second lens may be p/sinθ. Referring to a right triangle 910, a length of a bottom side may be p, a height may be sinθ, and one acute angle may be θ. Based on lengths of two sides and one acute angle of the right triangle 910, Equation 3 may be deduced.

$$c = \frac{p}{\sin\theta} \quad \text{[Equation 3]}$$

In Equation 3, c denotes a parameter corresponding to a period of the second pattern, p denotes the pitch of the optical layer, and θ denotes the rotation angle between the optical layer and the panel. The determiner 112 of FIG. 1 may determine the pitch p of the optical layer and the rotation angle θ between the optical layer and the panel based on Equations 2 and 3.

Figure 10A:
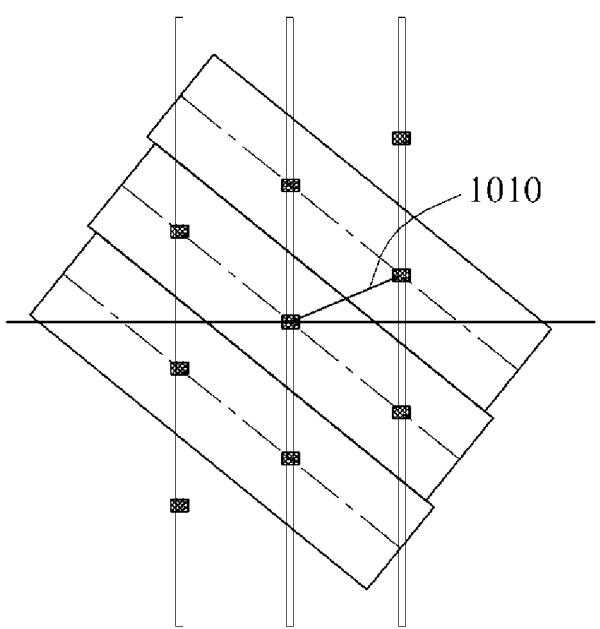
FIGS. 10A and 10B illustrate cases corresponding to various solutions according to at least one example embodiment.
Figure 10B:
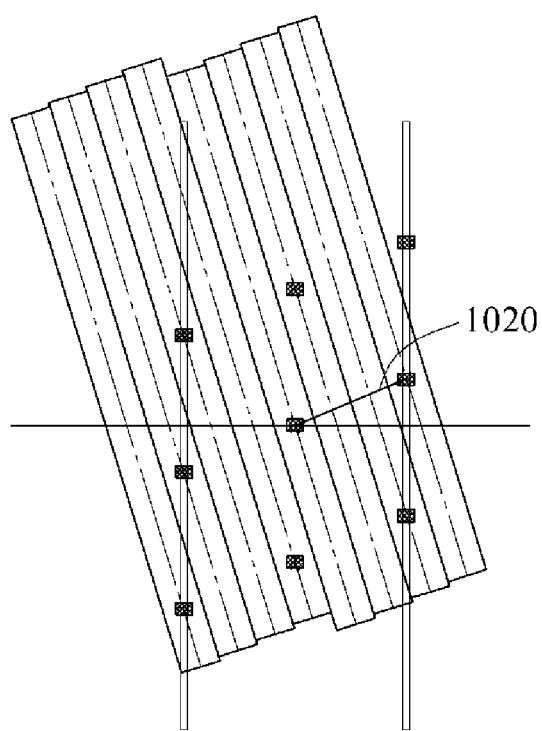

For ease of description, FIGS. 7 through 9 are described assuming a case in which n corresponds to "2". However, the pitch p of the optical layer and the rotation angle θ between the optical layer and the panel may vary depending on n. In an example, referring to FIG. 10A, in a situation in which a first pattern and a second pattern are given, a pitch p of an optical layer and a rotation angle θ between the optical layer and a panel satisfying Equations 2 and 3 in a case 1010 of n being "1" may be calculated. In another example, referring to FIG. 10B, in a situation in which a first pattern and a second pattern are given, a pitch p of an optical layer and a rotation angle θ between the optical layer and a panel satisfying Equations 2 and 3 in a case 1020 of n being "3" may be calculated.

In Equations 2 and 3, there are a total of three unknowns n, p, and θ. Since a number of the unknowns is greater than a number of equations, a plurality of solutions satisfying Equations 2 and 3 may exist. For example, a relationship between the number n of the elements of the optical layer corresponding to the single period of the first pattern and the rotation angle θ of the optical layer may be represented as shown in a graph of FIG. 11A.

The number n of the elements of the optical layer corresponding to the single period of the first pattern may be a positive integer greater than or equal to "1", and the rotation angle θ of the optical layer may be greater than or equal to −90 degrees and less than or equal to +90 degrees. Thus, candidate solutions may be extracted from the graph of FIG. 11A. For example, when n is "1", "2", "3", or "4", θ may be 23.2735 degrees, 11.9920 degrees, 8.0214 degrees, or 6.0218 degrees, respectively. When θ is known, p may be calculated based on Equation 3, as shown in a table of FIG. 11B.

When an initial parameter of a 3D display device is known, an optimal solution may be selected from candidate solutions based on the initial parameter. The initial parameter may be a design value for the 3D display device. The initial parameter may be a pitch of the optical layer. For example, when an optical layer of the 3D display device is designed to have a pitch of 0.5 millimeters (mm), a candidate solution of n=2 having a pitch p most approximate to the design value of 0.5 mm may be finally selected from the candidate solutions. When the optical layer of the 3D display device is designed to have a rotation angle of 12 degrees, a candidate solution of n=2 having a rotation angle θ most approximate to the design value of 12 degrees may be finally selected from the candidate solutions. At least one example embodiment may provide technology that determines a rotation angle of an optical layer and a pitch of the optical layer simultaneously.

Figure 12:
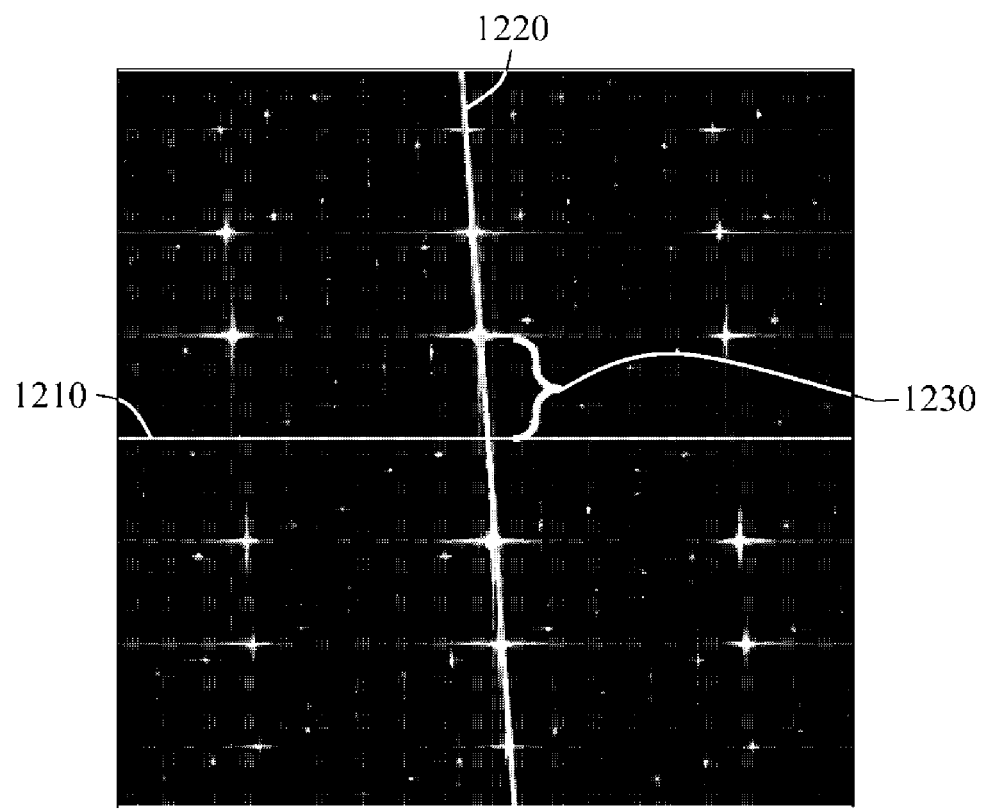
FIG. 12 illustrates a scheme of measuring a parameter corresponding to a gradient of a second pattern and a parameter corresponding to a period of the second pattern by performing a Fourier transform on an image of the second pattern according to at least one example embodiment.

FIG. 12 illustrates a scheme of measuring a parameter corresponding to a gradient of a second pattern and a parameter corresponding to a period of the second pattern by performing a Fourier transform on an image of the second pattern according to at least one example embodiment. At least one example embodiment may provide technology that measures parameters resistant against noise, irrespective of a gradient of a captured image.

A pattern included in an image of a second pattern may include noise, or may be irregular. Thus, an error may occur when measuring a gradient of the second pattern and/or a duration of the second pattern directly from the image of the second pattern. At least one example embodiment may provide technology that accurately measures a parameter corresponding to the gradient of the second pattern and a parameter corresponding to a period of the second pattern in a frequency domain by performing a Fourier transform on the image of the second pattern.

Referring to FIG. 12, an image 1200 may be a result of performing a Fourier transform on an image of a second pattern. Unlike the image of the second pattern, a gradient and a period of a pattern may be explicitly represented in the image 1200. Although noise is included in the image of the second pattern, the identical gradient and the identical period may be represented in the image 1200.

The determiner 112 of FIG. 1 may measure a parameter corresponding to the gradient of the second pattern and a parameter corresponding to the period of the second pattern using the image 1200. A line 1210 may be a line connecting points horizontally close to a center of the image 1200. The line 1210 may represent a vertical frequency component in the image of the second pattern, and indicate that the image of the second pattern is inclined. The determiner 112 may calibrate remaining gradients based on the line 1210. A line 1220 may be a line connecting points having highest intensities in the image 1200. A slope of the line 1220 may be perpendicular to the gradient of the second pattern.

The determiner 112 may measure the parameter corresponding to the gradient of the second pattern using Equation 4.

$$\alpha = b - \frac{\pi}{2} - a \quad \text{[Equation 4]}$$

In Equation 4, a denotes the parameter corresponding to the gradient of the second pattern, b denotes an angle between an x axis of the image 1200 and the line 1220, and a denotes an angle between the x axis of the image 1200 and the line 1210.

A height 1230 may be a height difference between the points having the highest intensities in the image 1200. In another example, the height 1230 may be a height of a point closest to an origin of the image 1200, among the points having the highest intensities in the image 1200. The determiner 112 may calculate a number of lines having an identical slope or an identical principal direction in the image of the second pattern by dividing the overall height of the image 1200 by the height 1230.

The determiner 112 may calculate the parameter corresponding to the period of the second pattern by dividing a height of an image of a first pattern displayed on the 3D display device by the calculated number. In this example, the determiner 112 may calculate a parameter corresponding to a period of the first pattern based on an actual interval between lines of the first pattern displayed on a panel.

The determiner 112 may calculate the parameter corresponding to the period of the second pattern by dividing a height of the captured image of the second pattern by the calculated number. In this example, the determiner 112 may calculate the parameter corresponding to the period of the first pattern by adjusting the actual interval between the lines of the first pattern displayed on the panel based on a ratio of a size of the panel to a size of the image of the second pattern.

The determiner 112 may determine the calibration parameter for the 3D display device more accurately by iteratively performing the foregoing processes. For example, the determiner 112 may determine a final calibration parameter based on statistics of calibration parameters deduced as a result of the iteratively performing. The determiner 112 may also determine the final calibration parameter by excluding a calibration parameter out of a normal distribution, among the calibration parameters. The determiner 112 may determine the final calibration parameter based on the calibration parameters deduced as a result of the iteratively performing, thereby minimizing a degree of inaccuracy of the final calibration parameter caused by an error included in a result of a single iteration.

Figure 11A:
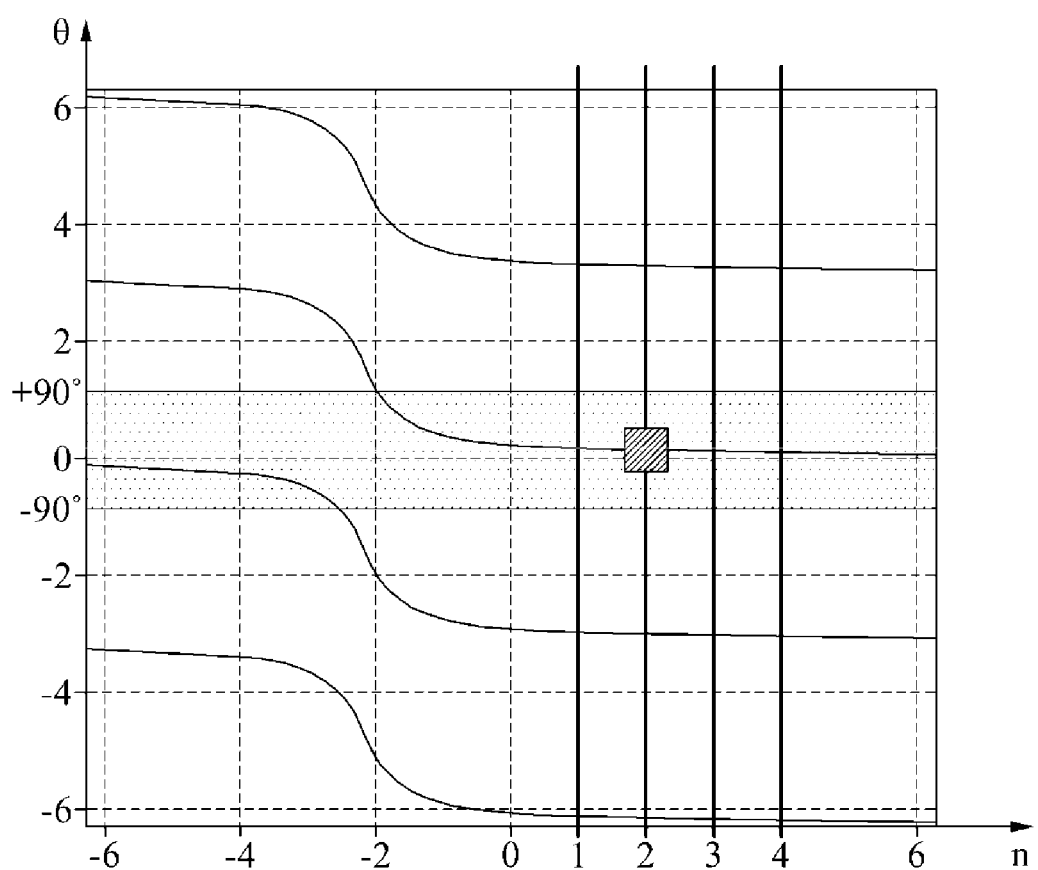

As described with reference to FIGS. 11A and 11B, the determiner 112 may need to select one candidate solution. The determiner 112 may obtain a plurality of sets of candidate solutions by iteratively performing the foregoing processes. The determiner 112 may finally select a candidate solution included in common sets of candidate solutions.

The determiner 112 may increase an accuracy of the calibration parameter based on images of the second pattern iteratively captured with respect to the identical image of the first pattern. In another example, the determiner 112 may increase the accuracy of the calibration parameter based on images of the second pattern captured while changing the image of the first pattern.

A method of changing the image of the first pattern may be applied in various manners. For example, the image of the first pattern may be changed sequentially using r subpixels, g subpixels, and b subpixels, while fixing a period of a pattern. In another example, the image of the first pattern may be changed by changing a period of a pattern, for example, an interval between lines in the pattern.

Figure 13:
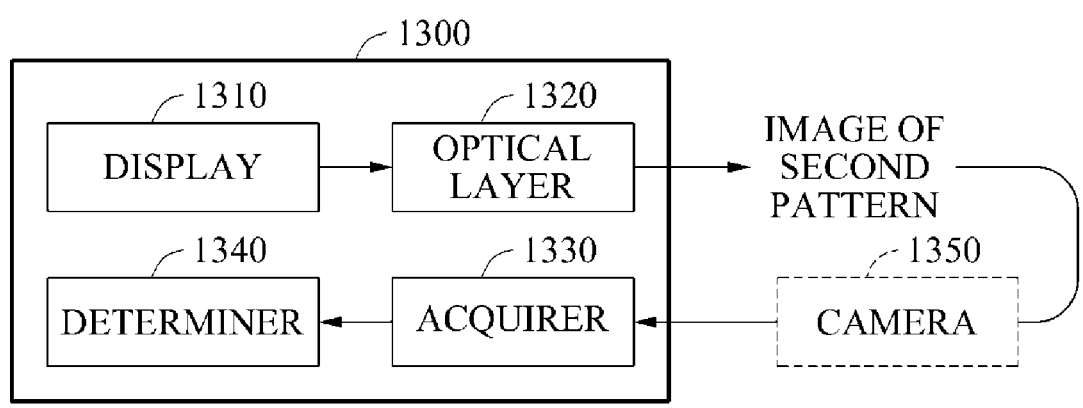
FIGS. 13 and 14 illustrate display devices, each including an apparatus for determining a calibration parameter according to at least one example embodiment.
Figure 14:
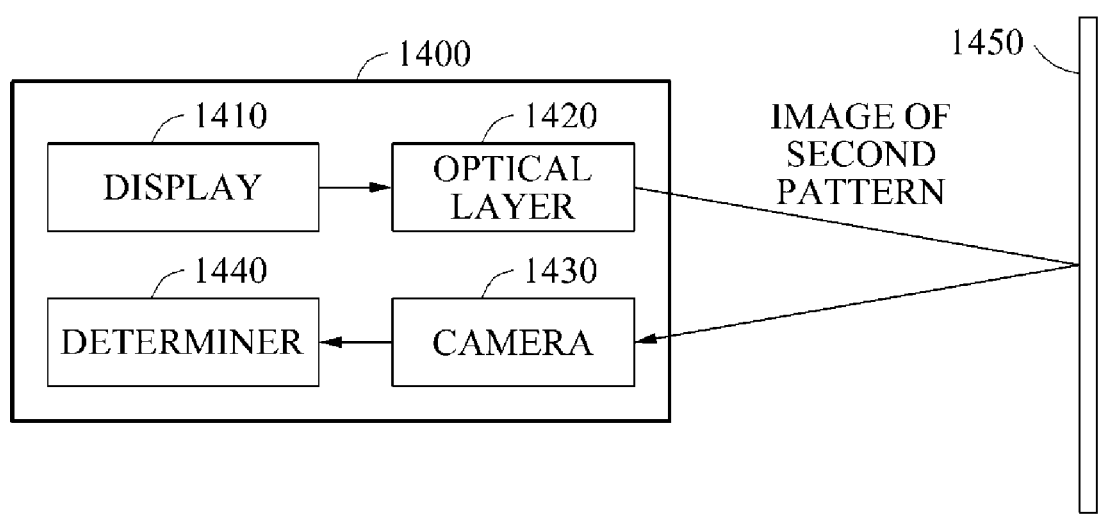

FIGS. 13 and 14 illustrate display devices, each including an apparatus for determining a calibration parameter according to at least one example embodiment. Referring to FIG. 13, a display device 1300 according to at least one example embodiment may include a display 1310, an optical layer 1320, an acquirer 1330, and a determiner 1340. The display 1310 may correspond to the panel 122 of FIG. 1, the optical layer 1320 may correspond to the optical layer 123 of FIG. 1, the acquirer 1330 may correspond to the acquirer 111 of FIG. 1, and the determiner 1340 may correspond to the determiner 112 of FIG. 1. In FIG. 13, light may be output from the display 1310 through the optical layer 1320. However, when the optical layer 1320 is attached to a rear surface of the display 1310, for example, when the optical layer 1320 is a directional backlight unit, light may be output from the optical layer 1320 through the display 1310.

An output image of a second pattern may be captured by a camera 1350, and the acquirer 1330 may receive the captured image. The acquirer 1330 may receive the captured image using various methods, for example, cable connection, wireless connection, and network communication. The descriptions provided with reference to FIGS. 1 through 12 may be applicable to each module of FIG. 13 and thus, duplicated descriptions will be omitted for conciseness.

Referring to FIG. 14, a display device 1400 according to at least one example embodiment may include a display 1410, an optical layer 1420, a camera 1430, and a determiner 1440. The display 1410 may correspond to the panel 122 of FIG. 1, the optical layer 1420 may correspond to the optical layer 123 of FIG. 1, and the determiner 1440 may correspond to the determiner 112 of FIG. 1. Although not shown in FIG. 14, the optical layer 1420 may be attached to a rear surface of the display 1410.

The camera 1430 may capture an image of a second pattern reflected in a minor 1450. In this example, the determiner 1440 may determine a calibration parameter for the display device 1400, in view of a left-right reversal of the captured image occurring when the image of the second pattern is reflected in the mirror 1450.

Figure 15:
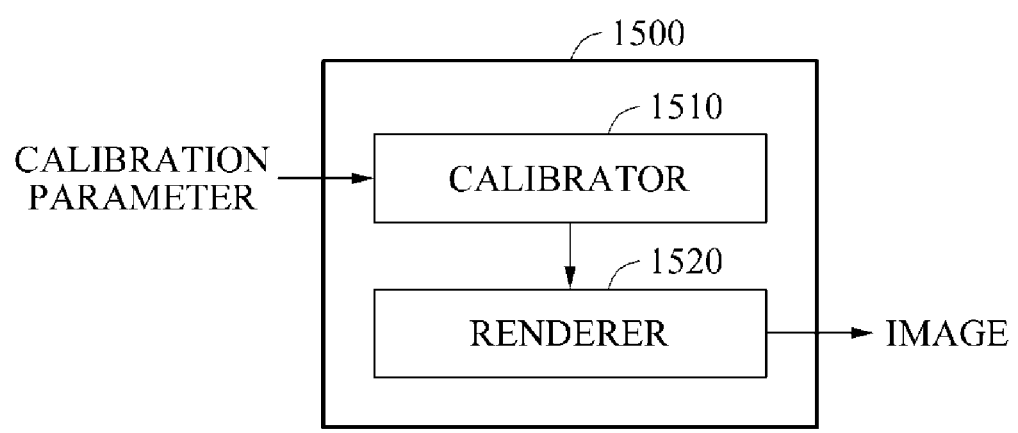
FIG. 15 illustrates a 3D display device configured to perform a calibration operation based on a calibration parameter according to at least one example embodiment.

FIG. 15 illustrates a 3D display device configured to perform a calibration operation based on a calibration parameter according to at least one example embodiment. Referring to FIG. 15, a 3D display device 1500 according to at least one example embodiment may include a calibrator 1510 and a renderer 1520. It should be understood that the calibrator 1510 and the renderer 1520 may be included in the same or separate device (e.g., an image processing device) as the acquirer 110 and the determiner 112 from FIG. 1. The calibrator 1510 may calibrate mapping information of a subpixel included in a panel based on a calibration parameter for the 3D display device 1500. The calibration parameter may be determined using the methods described with reference to FIGS. 1 through 14 and thus, duplicated descriptions will be omitted for conciseness.

The mapping information may indicate a propagation direction of light generated from the subpixel or output through the subpixel. For example, the mapping information may be mapping information between subpixels to be used to render a 3D image from a desired (or alternatively, predetermined) point of view and the corresponding point of view. In another example, the mapping information may be mapping information between a subpixel of a panel and an element of an optical layer to be used to render a 3D image.

The mapping information may be generated in a form of a matrix. Elements of the matrix may correspond to subpixels of the panel. The elements of the matrix may include at least one index. A value of an index may indicate a position of a point of view divided based on a desired (or alternatively, predetermined) position, for example, a viewing position, an angle indicating a direction of light, or a desired (or alternatively, predetermined) point of view.

Initial mapping information may be determined based on an initial parameter or a design value for the 3D display device 1500. For example, the initial mapping information may be generated from an initial parameter such as a pitch and an angle. The calibrator 1510 may calibrate the initial mapping information based on the calibration parameter.

In another example, the calibrator 1510 may generate new mapping information from a pitch and an angle corresponding to the calibration parameter, rather than calibrating the initial mapping information. In this example, the initial mapping information may not be generated. The new mapping information may accurately indicate a propagation direction of light generated from the subpixel or output through the subpixel.

The renderer 1520 may perform rendering for a 3D image based on the calibrated mapping information. For example, the renderer 1520 may determine an image to be displayed on the panel based on the calibrated mapping information, thereby reducing (or alternatively, preventing) an occurrence of crosstalk in the 3D image.

Figure 16:
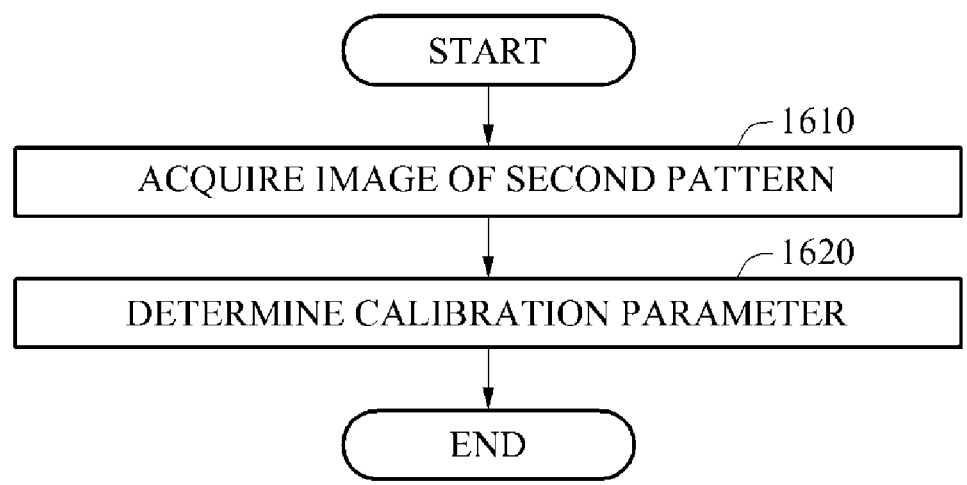
FIG. 16 is a flowchart illustrating a method of determining a calibration parameter according to at least one example embodiment.

FIG. 16 is a flowchart illustrating a method of determining a calibration parameter according at least one example embodiment. Referring to FIG. 16, a method of determining a calibration parameter according to at least one example embodiment may include operation 1610 of acquiring an image of a second pattern output through a panel and an optical layer when an image of a first pattern is applied to the panel, and operation 1620 of determining a calibration parameter for a 3D display device based on the first pattern and the second pattern. Operation 1610 may correspond to an operation of the acquirer 111 of FIG. 1, and operation 1620 may correspond to an operation of the determiner 112 of FIG. 1. The descriptions provided with reference to FIGS. 1 through 12 may be applicable to each operation of FIG. 16 and thus, duplicated descriptions will be omitted for conciseness.

Figure 17A:
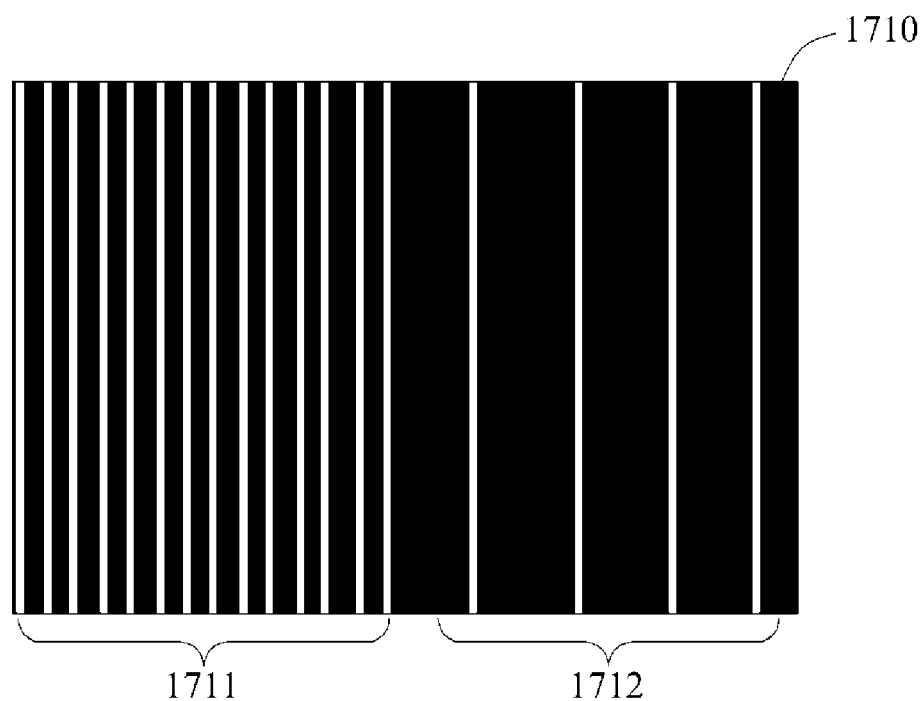
FIGS. 17A and 17B illustrate examples of applications of an image of a first pattern.
Figure 17B:
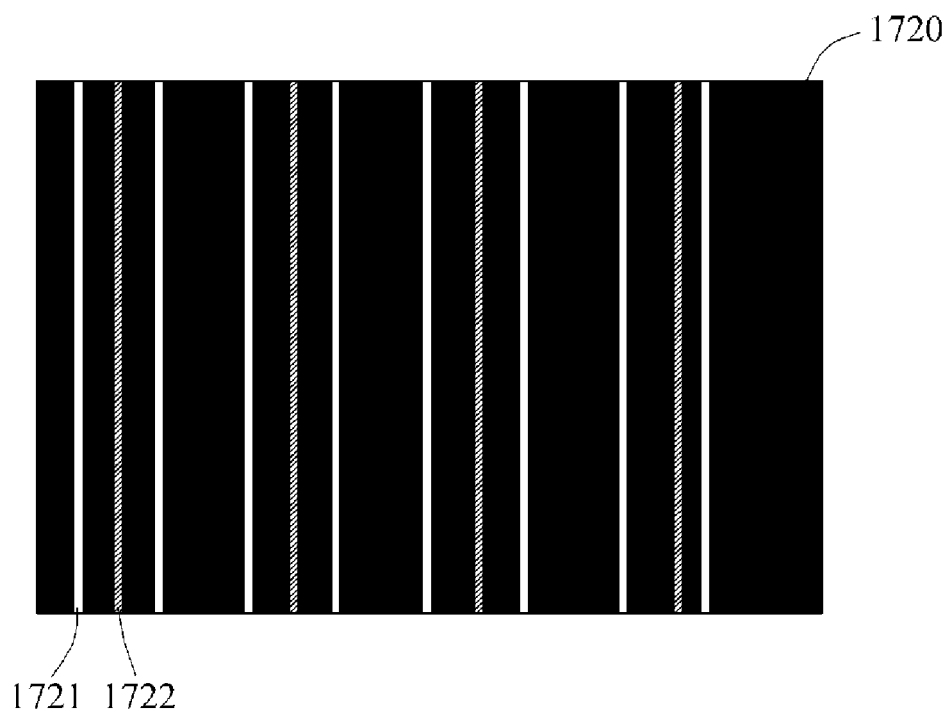

FIGS. 17A and 17B illustrate examples of applications of an image of a first pattern. Referring to FIGS. 17A and 17B, at least two patterns may be included in a single image of a first pattern. Referring to FIG. 17A, an image 1710 may include two patterns 1711 and 1712 having different periods. The two patterns 1711 and 1712 having different periods may be spatially separated from each other in the image 1710. Referring to FIG. 17B, an image 1720 may include two patterns 1721 and 1722 having different colors. Periods of the two patterns 1721 and 1722 having different colors may be different from or identical to each other.

When a single image of a first pattern includes a plurality of patterns, the determiner 112 of FIG. 1 may determine a calibration parameter with respect to each of the plurality of patterns. The determiner 112 may determine a final calibration parameter based on the determined plurality of calibration parameters.

Figure 18:
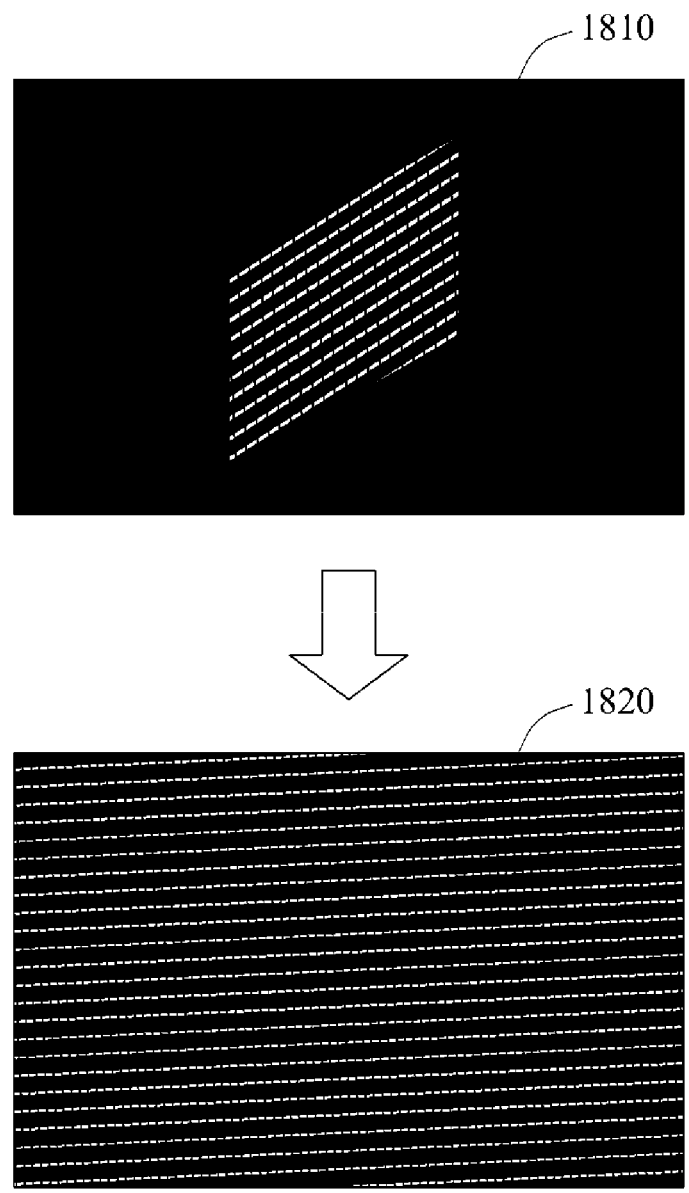
FIG. 18 illustrates a method of normalizing an image of a second pattern according to at least one example embodiment.

FIG. 18 illustrates a method of normalizing an image of a second pattern according to at least one example embodiment. Referring to FIG. 18, an image 1810 captured from a predetermined point of view may include a distorted image of a second pattern. When the Fourier transform described with reference to FIG. 12 is used, parameters used to determine a calibration parameter may be preserved although the distorted image of the second pattern is used. The parameters may include, for example, an interval between points in a Fourier-transformed image, and a gradient with respect to a reference axis.

The determiner 112 of FIG. 1 may convert the distorted image of the second pattern into a normalized image 1820 of a rectangular shape. The normalized image 1820 may have a characteristic robust against a geometric change and/or a photometric change, when compared to the distorted image of the second pattern. For example, the determiner 112 may detect four edges or vertices of the distorted image of the second pattern from the captured image 1810. The determiner 112 may convert the distorted image of the second pattern into the normalized image 1820 based on the detected four edges or vertices. The normalized image 1820 may have a size identical to that of an image of a first pattern displayed on a panel. The determiner 112 may determine the calibration parameter based on the normalized image 1820.

At least one example embodiment may display, on a panel, a 2D pattern of which a size is known, capture an image reaching a desired (alternatively, predetermined) point of view through a 3D converter such as an optical layer, and determine a calibration parameter for a 3D display device by analyzing the captured image. At least one example embodiment may employ a calibration scheme to determine the calibration parameter. The calibration scheme may be a scheme of determining a parameter of a transform function f(x) by comparing a known value x to a value y obtained through the transform function f(x).

According to at least one example embodiment, a pattern displayed on the panel may be x, the 3D converter may be f(x), and the captured image may be y. At least one example embodiment may determine the parameter of the transform function f(x), for example, the calibration parameter for the 3D display device, by analyzing the captured image y.

At least one example embodiment may provide automatic calibration technology for a 3D display device. According to at least one example embodiment, when producing 3D display devices in large quantities, a calibration parameter for each individual 3D display device may be determined. Further, when an installation state of a 3D converter changes, the calibration parameter may be re-determined.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of determining a calibration parameter for a three-dimensional (3D) display device, the method comprising:
    acquiring an image of a first pattern output through a panel and an optical layer as an image of a second pattern; and
    determining the calibration parameter for the 3D display device based on a parameter corresponding to a period of the first pattern, a parameter corresponding to a gradient of the second pattern, and a parameter corresponding to a period of the second pattern,
    wherein the parameter corresponding to the period of the first pattern is an interval between lines included in the first pattern, and
    wherein the determining comprises calculating a rotation angle $\theta$ between the optical layer and the panel and a pitch p of the optical layer based on relations between the rotation angle $\theta$ and the pitch p, the relations comprising:
    a first relation between the rotation angle $\theta$ and the pitch p being based on the parameter corresponding to the period of the first pattern and the parameter corresponding to the gradient of the second pattern; and
    a second relation between the rotation angle $\theta$ and the pitch p being based on the parameter corresponding to the period of the second pattern.

2. The method of claim 1, wherein the first pattern is displayed using subpixels aligned in the panel.

3. The method of claim 1, wherein the first pattern is a pattern in which continuous lines of an identical brightness are at desired intervals.

4. The method of claim 1, wherein the second pattern is a pattern in which lines comprising a plurality of points are at desired intervals.

5. The method of claim 1, wherein the optical layer comprises at least one of a lens array, a parallax barrier, and a directional backlight.

6. The method of claim 1, wherein the calibration parameter comprises at least one of:
    a parameter associated with a size of the optical layer; and
    a parameter associated with a position of the optical layer.

7. The method of claim 6, wherein the parameter associated with the size of the optical layer comprises a pitch of the optical layer.

8. The method of claim 6, wherein the parameter associated with the position of the optical layer comprises the rotation angle between the optical layer and the panel.

9. The method of claim 1, wherein the determining comprises obtaining a parameter corresponding to the period of the first pattern based on a subpixel structure of the panel.

10. The method of claim 9, wherein the subpixel structure of the panel comprises an interval between subpixels of a color used for the first pattern.

11. The method of claim 1, wherein the determining comprises at least one of:
measuring a parameter corresponding to the gradient of the second pattern; and
measuring a parameter corresponding to the period of the second pattern.

12. The method of claim 11, wherein the parameter corresponding to the gradient of the second pattern comprises a slope of a line included in the second pattern.

13. The method of claim 11, wherein the parameter corresponding to the period of the second pattern comprises an interval between lines included in the second pattern.

14. The method of claim 1, wherein the determining comprises:
performing a Fourier transform on the image of the second pattern;
measuring a parameter corresponding to the gradient of the second pattern based on the Fourier-transformed image; and
measuring a parameter corresponding to the period of the second pattern based on the Fourier-transformed image.

15. The method of claim 14, wherein the measuring of the parameter corresponding to the period of the second pattern comprises:
calculating a height difference between pixels having highest intensities in the Fourier-transformed image; and
calculating an interval between lines included in the second pattern based on the calculated height difference and a height of the Fourier-transformed image.

16. The method of claim 14, wherein the measuring of the parameter corresponding to the gradient of the second pattern comprises:
calculating a slope of a first line connecting pixels having highest intensities in the Fourier-transformed image; and
calculating a slope of a second line included in the second pattern based on the calculated slope of the first line.

17. The method of claim 16, wherein the measuring of the parameter corresponding to the gradient of the second pattern further comprises:
detecting a point that is horizontally closest to an origin of the Fourier-transformed image; and
calculating a slope of a third line connecting the origin and the detected point,
wherein the slope of the second line is calibrated based on the calculated slope of the third line.

18. The method of claim 1, wherein the first relation corresponds to Equation 1 and the second relation corresponds to Equation 2, $$g \tan\alpha \sin\theta + g\cos\theta - np = 0 \qquad \text{[Equation 1]}$$

$$c = \frac{p}{\sin\theta}, \qquad \text{[Equation 2]}$$

wherein g denotes a parameter corresponding to the period of the first pattern, a denotes a parameter corresponding to the gradient of the second pattern, c denotes a parameter corresponding to the period of the second pattern, n denotes a number of elements of the optical layer corresponding to a single period of the first pattern, θ denotes the rotation angle between the optical layer and the panel, and p denotes the pitch of the optical layer.

19. The method of claim 18, wherein the calculating of the rotation angle between the optical layer and the panel and the pitch of the optical layer comprises:
calculating (n, θ) candidates having n being a positive integer, and θ being an angle within a desired range;
selecting one of the (n, θ) candidates based on an initial parameter; and
calculating p corresponding to the selected (n, θ) candidate.

20. The method of claim 1, wherein, if a subpixel structure of the panel corresponds to a red, green, and blue (RGB) stripe structure, the first pattern corresponds to a stripe pattern having one of red, green, and blue colors, and a direction in which subpixels of an identical color are aligned in the panel.

21. The method of claim 1, wherein the image of the second pattern is a single image.

22. A non-transitory computer-readable medium comprising program code that, when executed by a processor, performs operations according to the method of claim 1.

23. A three-dimensional (3D) display device comprising:
memory storing computer-executable instructions; and
one or more processors configured to execute the computer-executable instructions such that the one or more processors are configured to,
calibrate mapping information of a subpixel included in a panel based on a calibration parameter for the 3D display device, and
perform rendering for a 3D image based on the calibrated mapping information,
wherein the one or more processors are further configured to execute the computer-executable instructions such that the one or more processors are configured to determine the calibration parameter based on,
an image of a second pattern output through a combination of the panel and an optical layer, the second pattern being based on an image of a first pattern applied to the panel,
a parameter corresponding to a period of the first pattern,
a parameter corresponding to a gradient of the second pattern, and
a parameter corresponding to a period of the second pattern,
wherein the parameter corresponding to the period of the first pattern is an interval between lines included in the first pattern, and
wherein the one or more processors are further configured to calculate a rotation angle θ between the optical layer and the panel and a pitch p of the optical layer based on relations between the rotation angle 9 and the pitch p, the relations comprising:
a first relation between the rotation angle 9 and the pitch p being based on the parameter corresponding to the period of the first pattern and the parameter corresponding to the gradient of the second pattern; and
a second relation between the rotation angle 9 and the pitch p being based on the parameter corresponding to the period of the second pattern.

24. The 3D display device of claim 23, wherein the first pattern is displayed using subpixels aligned in the panel.

25. The 3D display device of claim 23, wherein the first pattern is a pattern in which continuous lines of an identical brightness are at desired intervals, and the second pattern is a pattern in which lines comprising a plurality of points are at desired intervals.

26. The 3D display device of claim 23, wherein the optical layer comprises at least one of a lens array, a parallax barrier, and a directional backlight unit.

27. The 3D display device of claim 23, wherein the parameter corresponding to the gradient of the second pattern comprises a slope of a line included in the second pattern, and the parameter corresponding to the period of the second pattern comprises an interval between lines included in the second pattern.

28. The 3D display device of claim 23, wherein the parameter corresponding to the period of the first pattern is obtained based on a subpixel structure of the panel.

29. The 3D display device of claim 28, wherein the subpixel structure of the panel comprises an interval between subpixels of a color used for the first pattern in the panel.

30. The 3D display device of claim 23, wherein at least one of the parameter corresponding to the gradient of the second pattern and the parameter corresponding to the period of the second pattern is measured based on an image acquired by performing a Fourier transform on the image of the second pattern.

31. The 3D display device of claim 30, wherein the one or more processors are further configured to execute the computer-executable instructions such that, to measure the parameter corresponding to the period of the second pattern, the one or more processors determine an interval between lines included in the second pattern based on a height difference between pixels having highest intensities in the Fourier-transformed image and a height of the Fourier-transformed image.

32. The 3D display device of claim 30, wherein the one or more processors are further configured to execute the computer-executable instructions such that, to measure the parameter corresponding to the gradient of the second pattern, the one or more processors determine a slope of a first line included in the second pattern based on a slope of a second line connecting pixels having highest intensities in the Fourier-transformed image.

33. The 3D display device of claim 23, wherein the calibration parameter comprises at least one of:

a parameter associated with a size of the optical layer; and a parameter associated with a position of the optical layer.

34. The 3D display device of claim 33, wherein the parameter associated with the size of the optical layer comprises a pitch of the optical layer, and the parameter associated with a pose of the optical layer comprises the rotation angle between the optical layer and the panel.

35. The 3D display device of claim 23, wherein the first relation corresponds to Equation 1 and the second relation corresponds to Equation 2, $$g \tan\alpha \sin\theta + g\cos\theta - np = 0 \qquad \text{[Equation 1]}$$

$$c = \frac{p}{\sin\theta}, \qquad \text{[Equation 2]}$$

wherein g denotes a parameter corresponding to the period of the first pattern, a denotes a parameter corresponding to the gradient of the second pattern, c denotes a parameter corresponding to the period of the second pattern, n denotes a number of elements of the optical layer corresponding to a single period of the first pattern, θ denotes the rotation angle between the optical layer and the panel, and p denotes the pitch of the optical layer.

36. The 3D display device of claim 23, wherein the image of the second pattern is a single image.

37. A device comprising:

memory storing computer-executable instructions; and one or more processors configured to execute the computer-executable instructions such that the one or more processors are configured to, determine a calibration parameter for a three-dimensional (3D) display device based on, a first image having a first pattern and a second image having a second pattern, the second image being a version of the first image that is displayed with a panel and an optical layer of the 3D display device, a parameter corresponding to a period of the first pattern, a parameter corresponding to a gradient of the second pattern, and a parameter corresponding to a period of the second pattern, and calibrate subpixels of the panel based on the calibration parameter to indicate a propagation direction of light from each subpixel, wherein the parameter corresponding to the period of the first pattern is an interval between lines included in the first pattern, and wherein the one or more processors are further configured to calculate a rotation angle θ between the optical layer and the panel and a pitch p of the optical layer based on relations between the rotation angle θ and the pitch p, the relations comprising:

a first relation between the rotation angle θ and the pitch p being based on the parameter corresponding to the period of the first pattern and the parameter corresponding to the gradient of the second pattern; and a second relation between the rotation angle θ and the pitch p being based on the parameter corresponding to the period of the second pattern.

38. The device of claim 37, wherein the first pattern is a pattern in which continuous lines of an identical brightness are at desired intervals.

39. The device of claim 37, wherein the second pattern is a pattern in which lines comprising a plurality of points are at desired intervals.

40. The device of claim 37, wherein the optical layer comprises at least one of a lens array, a parallax barrier, and a directional backlight.

41. The device of claim 37, wherein the calibration parameter comprises at least one of:
   a parameter associated with a size of the optical layer; and
   a parameter associated with a position of the optical layer.

42. The device of claim 37, wherein the one or more processors are further configured to execute the computer-executable instructions such that the one or more processors are configured to render a calibrated image based on the calibrated subpixels.

* * * * *